Jan. 31, 1967 F. A. BEKAERT 3,301,966

CALL TRANSMITTER

Filed Sept. 5, 1963

Inventor
F. BEKAERT
By [signature]
Attorney

United States Patent Office 3,301,966
Patented Jan. 31, 1967

3,301,966

CALL TRANSMITTER

Frans Alfons Bekaert, Antwerp, Belgium, assignor to International Standard Electric Corporation, a corporation of Delaware Filed Sept. 5, 1963, Ser. No. 306,754
Claims priority, application Netherlands, Sept. 12, 1962, 283,122
4 Claims. (Cl. 179—90)

Figure 1:
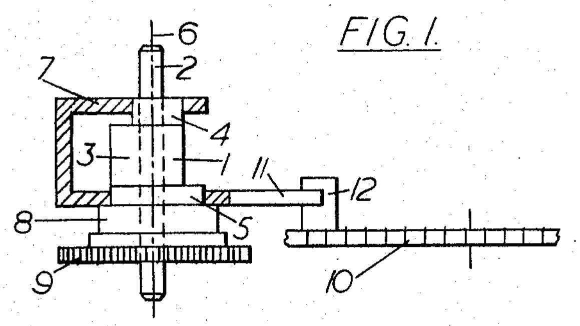

The invention relates to telephone handsets and more particularly to call transmitter or dial pulsing mechanisms of the type that includes a pair of contact springs simultaneously displaced to one side by a pulsing cam and yoke assembly during the wind-up cycle of a gear train. A first gear of the train is coupled directly to said pulsing cam and rotates in the same direction as a second gear of said train. During the run-down cycle of the train, the yoke prevents one of the springs from following the motion of the other spring as it is displaced by said pulsing cam, thereby opening the contacts.

Such well known dial pulse mechanisms offer the advantage of rapid, definite contact opening with the minimum of chatter and in general satisfactory contact operation to serve telephone subscribers. Another advantage of this type of dial pulse mechanism is that it can provide lost motion time before the digital pulses are transmitted. This is particularly useful since this lost motion time at the beginning of the rundown cycles will allow the speed regulator usually associated with dial pulsing mechanisms to reach a steady operation before the digital pulses are sent out thereby ensuring better limits for the pulses. This lost motion is in any event desirable as the interdigital time between successive trains of digital pulses transmitted by a telephone subscriber using his dial, is composed of the hunt time, i.e., the time required by the subscriber to locate the next digit to be dialed, the wind-up time and the lost motion time when no pulses are generated during run down. This last part is evidently essential when the first two parts are short as is the case with fast dialers.

While the dial pulsing mechanism of the above type can provide such lost motion time before producing the digital pulses, this motion is limited to less than one rotation of the cam shaft during run-down and this controlled incremental time during run-down cannot therefore exceed the time taken for such partial first rotation. In some circumstances, this lost motion time corresponding to less than one digital pulse cannot be considered as sufficient for some telephone exchanges where the interdigital time must be larger to permit adequate discrimination when a fast dialer successively dials two "1" digits of a called telephone number.

In order to increase the interdigital time, one may place the dial fingerholes closer together so that with the closer spacing additional dial pulses would be produced for each digit, e.g., one or two additional pulses, but means are then additionally required to cancel this extra pulse or pulses and the time of the non-emitted cancelled pulses thus provide the extra interdigital time wanted. This may be achieved, for instance, by mounting on the central major gear of the dial gear train which is directly driven by a motor spring, a cam of suitable shape which towards the end of the run-down motion close an additional pair of contact springs which are electrically connected in the shunt across the dial pulse contact springs to short-circuit the last pulse or pulses. Obviously, however, this additional contact increases the chance of electrical troubles, bearing in mind the very large number of contact operations which are required for modern telephone dials.

Another way to increase the interdigital time and still keep lost motion before the digital pulse is by mounting the pulsing cam on a disc frictionally spring coupled to a major gear. This disc bearing the axis of the pulsing cam is displaced during wind-up to a first position where the pulsing cam is rotated as the result of the wind-up rotation of the major gear, but remains out of reach of the contact springs. At the beginning of the run-down motion, the disc is first rotated to a second position in which the pulsing cam cooperates with the contact springs to provide pulses. The time taken to reach this second position thus constitutes the lost motion time which may be adjusted to the desired value. This solution is relatively complicated as the axis of the pulsing cam can no longer be in a fixed predetermined position but must be displaceable on a rotatable disc which is frictionally clutched with the major gear. Moreover, this solution implies substantial additional power in order to cancel in this manner the extra pulse or pulses which would otherwise be created during the run-down time.

In the U.S. Patent No. 2,963,554 a pulsing mechanism of the type initially defined and which thus provides a lost motion time having the duration of about one digital pulse before emitting a pulse is disclosed with a particular design of the pulsing cam and yoke assembly which reduces contact spring fatigue and furthe diminishes the torque requirements for contact separation as a result of practically halving the displacement of the dial pulse contact springs by displacing them in opposite directions. For dial pulsing mechanism of the general type initially defined as well as that of the above U.S. patent, it is particularly desirable, when securing additional lost motion time, to avoid an increased torque one disadvantage of which is the likelihood of a light-weight subset being displaced upon wind-up of the dial, resulting in dialing errors.

Therefore an object of this invention is to provide an improved dial mechanism.

A related object of the invention is to provide additional lost motion in an arrangement of the above type that already affords some amount of lost motion at the beginning of the run-down cycle, by causing one or more extra rotations of the pulsing cam and by the cancellation of the corresponding pulses at the end of the run-down period with a very small amount of additional torque.

In accordance with the characteristic of the invention, a dial pulsing mechanism is initially defined is characterized by the fact that the yoke is provided with an extended projecting part able to cooperate with a lost motion cam member mounted on said second gear as the latter reaches the end of said run-down cycle. Since the pulsing cam cooperates at that time with said contact springs, the action of said lost motion cam member on the yoke causes the yoke to be deflected out of range of the contact springs during the last part of the run-down cycle.

This arrangement offers the advantages that it makes use of existing parts since only a small additional cam member of light material is mounted on the central gear. Due to rotation of the latter in the same direction as the gear on which the pulsing cam mechanism is secured, the additional cam member cooperates with a rear extension of the yoke part of the pulsing cam assembly. Since this yoke is also of light material, the additional torque is relatively small. The additional lost motion time after the digital pulses provides an increased interdigital time that ensures a clean separation between the last closure of the dial pulse contact springs and the subsequent opening of the off-normal receiver short-circuiting contact, which opening takes place under the control of a stud on a second gear at the end of the run-down motion.

Figure 2:
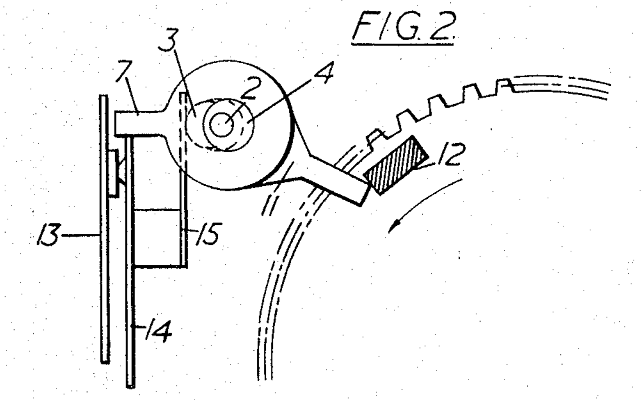
Figure 3:
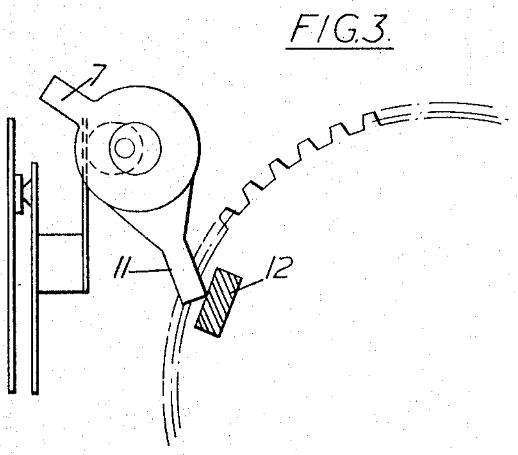

The above and other objects and features of the invention will be better understood from the following description of a detailed embodiment of the invention to be read in conjunction with appended drawings which represent:

FIG. 1, a greatly enlarged elevational view of the pulsing cam in accordance with the invention;

FIG. 2, a fragmentary view of the pulsing cam and contact arrangement towards the end of the run-down cycle when a cam member on an associated gear starts to displace the yoke part of the pulsing cam assembly; and FIG. 3, the same view as in FIG. 2 with the cam member on the associated gear having displaced the yoke out of reach of the contact springs.

Referring to FIG. 1, the latter shows the pulsing cam assembly comprising the pulsing cam 1, advantageously realized as a unitary molded piece in a material, such as nylon, and with a shaft 2 which may be out of steel, molded through the cam 1 and permitting the rotation of the cam with the shaft 2 during dialling operation. The cam 1 includes a central cam surface having a single lobe 3, this central part being included between upper and lower cylindrical bearing surfaces 4 and 5 which have a common central axis which is however eccentrically displaced from the central axis 6 of the shaft 2. This displacement of the axis of the concentric bearing surfaces 4 and 5 is 180° opposite to the position of the single lobe 3 of the central part o fthe cam 1. Journaled about the bearing surfaces 4 and 5 is the yoke 7 which is made of slightly flexible molded dielectric material, such as delrin. The arms of the yoke 7 are flexed slightly inwards in their assembled position to provide frictional engagement with the retaining cylindrical member 8 on which the cam and yoke assembly rests, this retaining member 8 being frictionally secured to the shaft 2 and located above gear 9 which is secured to shaft 2. This gear 9 may be driven by a partially shown second or major gear 10, located at the center of the dial. The gears 9 and 10 are meshed through a pair of intermediate gears (not shown) rotating together on the same shaft, this explaining the level difference between gear 9 and the major gear 10; gears 9 and 10 always rotate in the same direction. So far, the arrangement corresponds to that of the U.S. Patent No. 2,963,554. Additionally however, the yoke 7 has its lower arm surrounding cylindrical bearing surface 5 extended to the other side of its vertical part that links the upper and lower arms of the yoke. This extension 11 protrudes sufficiently in the direction of the associated major gear 10 and above the gear 10 so that a cam member 12 mounted thereon will, during the last part of the run-down cycle, engage the extension 11 in such a way as to cancel the last digital pulse or pulses which would otherwise be created.

FIG. 2 shows part of the arrangement in plan view, the cam assembly being shown in the position attained during the run-down cycle while the cam and yoke assembly effectively produce the displacement of the contact springs 13 and 14. As shown and disclosed in the U.S. patent previously mentioned, the contact spring 14 is provided with an extension 15 acting as a cam follower in cooperation with the central part of the pulsing cam 1. As shown, the single lobe 3 of this central part has driven the extension 15 to its outer left position and this has entailed the displacement toward the left of both cam contact springs 14 and 13 which remain in contact with one another. This is due to the fact that the center of the concentric upper and lower bearing surfaces 4 and 5, the latter being not shown in FIGS. 2 and 3, being at 180° with respect to the single lobe 3, as shown in FIG. 2, the yoke 7 is in its outermost righthand position and out of reach of the contact spring 13. As disclosed in the U.S. patent previously mentioned, the rotation of cam 1 in an anti-clockwise direction during the run-down cycle would cause during each revolution of the cam 1, the single lobe 3 to pass through its extreme right position while simultaneously, the yoke 7 would occupy its outer left position (not shown). In such a position, the cam follower part 14 of contact spring 14 would be displaced to the right while the vertical part of the yoke 7 that links its two arms would push the contact spring 13 by a like amount towards the left. This opposite displacement of the ends of the contact springs which are normally kept together as shown will separate them, thus opening the contact. During wind-up of the dial when the yoke 7 does not abut contact spring 13, due to suitable pretensioning the latter then remains in contact with spring 14.

In the position shown in FIG. 2, the contact springs 13 and 14 are again closed after the last effective opening and the action of the cam member 12 on the extension 11 of the yoke will now slightly rotate the latter in a clockwise direction.

FIG. 3 shows the position of the yoke 7 during this rotation and it is seen that the yoke and more particularly, its upper arm has been disengaged from the end of the contact spring 14 against which it normally rests while the contact openings are produced during the run-down motion by the successive displacements of the yoke towards the left thereby pushing contact spring 13 in that direction while simultaneously the single lobe 3 of the cam 1 allows contact spring 14 to be displaced towards the right. Since as shown in FIG. 3, the yoke 7 is kept out of reach of the contact springs during the last part of the run-down motion, the further rotation of the pulsing cam 1 will merely cause its lobe 3 to make one or more cyclic displacements of the contact spring 13 and 14 by acting on the cam follower part 15 of the latter, but the two contact springs will be flexed together and keep a closed contact in the same way as this is maintained during the wind-up motion. At the end of the run-down motion, the yoke 7 is still displaced as shown and during a subsequent dialling operation since both gears 9 and 10 will be rotated in a clockwise direction during the initial wind-up motion, this clockwise rotation of gear 9 will entail a like rotation of the yoke 7 whose extension 11 passes underneath the contact springs 13 and 14 until the vertical part of the yoke linking its two horizontal arms comes to abut against the cam follower part 15. This follows the teaching of the previously mentioned U.S. patent, and also as disclosed, therein, the yoke 7 will then perform an anti-clockwise rotation of about 270° from this last position (not shown) at the start of the rundown motion, to provide lost motion before the digital pulses are transmitted.

While the principles of the invention have been described above in connection with specific apparatus, it is to be clearly understood that this description is made only by way of example and not as a limitation on the scope of the invention.

I claim:

1. A telephone dial pulsing mechanism comprising a gear train mounted to rotate in either a forward or a reverse direction, a pair of flexible contact spring members for producing pulses during gear train rotation in said reverse direction, cam means, means mounted on a first gear in said gear train spring actuating means, cam means abutting said cam means and contiguous to said spring members for repeatedly flexing said spring members in unison as said cam means rotates whereby said springs remain in electrical contact with each other as they flex, immobilizing means normally continguous to one of said spring members during the gear motion in said reversed direction for immobilizing said one of said spring members during the gear motion in said reverse direction whereby said springs repeatedly separate to break electrical contact with each other as the non-immobilized spring flexes, and negating means effective a predetermined distance from the end of said gear motion in said reverse direction for moving said immobilizing means from said contiguous relationship to said one of said spring members for negating said immobilizing means whereby said springs remain in electrical contact with each other as they flex during the remainder of said gear motion.

2. In the pulsing mechanism of claim 1 wherein said immobilizing means comprises a yoke assembly mounted on said first gear, means responsive to gear motion of said first gear in the reverse direction for positioning said yoke to immobilize said contact spring member.

3. A telephone dial pulsing mechanism comprising a gear train mounted to rotate in either a forward or a reverse direction, a pair of contact spring members for producing pulses during gear rotation in said reverse direction, cam means mounted on a first gear in said gear train for repeatedly flexing said spring members in unison whereby said springs remain in electrical contact with each other as they flex, yoke assembly means mounted on said first gear, means responsive to gear motion of said first gear in the reverse direction for positioning said yoke to immobilize one of said contact spring members in said reverse direction whereby said spring members repeatedly separate to break electrical contact with each other as the non-immobilized spring flexes, means extending from said yoke, and means mounted on a second gear in said train for abutting said extending means to move said yoke from said immobilized position at a predetermined distance from the en dof said gear motion in said reverse direction thereby negating said immobilizing means and causing said springs to remain in electrical contact with each other as they flex during the remainder of said gear motion.

4. In the pulsing mechanism of claim 3 wherein said second gear rotates in the same direction as said first gear.

References Cited by the Examiner

UNITED STATES PATENTS

| | | | |
|---|---|---|---|
| 1,506,760 | 9/1924 | Lysons | 179—90 |
| 1,532,676 | 4/1925 | Blessing | 179—90 |
| 2,963,554 | 12/1960 | Hershey | 179—90 |

WILLIAM C. COOPER, *Acting Primary Examiner.*

J. W. JOHNSON, R. P. TAYLOR, *Assistant Examiners.*